United States Patent
Varadan et al.

(10) Patent No.: US 12,190,266 B2
(45) Date of Patent: Jan. 7, 2025

(54) RESOURCE-CONSTRAINED, MULTI-PERIOD SCHEDULING MODEL FOR ASSET INVESTMENT PLANNING

(71) Applicant: Hitachi Energy Ltd, Zurich (CH)

(72) Inventors: Srinivas Varadan, Cary, NC (US); William Rutz, Cary, NC (US)

(73) Assignee: Hitachi Energy Ltd, Zurich (CH)

( * ) Notice: Subject to any disclaimer, the term of this patent is extended or adjusted under 35 U.S.C. 154(b) by 459 days.

(21) Appl. No.: 17/491,410

(22) Filed: Sep. 30, 2021

(65) Prior Publication Data
US 2023/0099025 A1    Mar. 30, 2023

(51) Int. Cl.
*G06Q 10/00*     (2023.01)
*G06F 9/54*      (2006.01)
(Continued)

(52) U.S. Cl.
CPC ......... *G06Q 10/06313* (2013.01); *G06F 9/54* (2013.01); *G06Q 10/20* (2013.01)

(58) Field of Classification Search
CPC .............................................. G06Q 10/06313
See application file for complete search history.

(56) References Cited

U.S. PATENT DOCUMENTS

| | | | |
|---|---|---|---|
| 9,946,571 B1 * | 4/2018 | Brown ................ | G06F 9/4893 |
| 2006/0200400 A1 * | 9/2006 | Hunter ................ | G06Q 10/00 705/36 R |

(Continued)

FOREIGN PATENT DOCUMENTS

| | | |
|---|---|---|
| CA | 2913827 A1 | 3/2016 |
| EP | 3483798 A1 | 5/2019 |

(Continued)

OTHER PUBLICATIONS

H. Bui, X. Han, S. Mandal, K. R. Pattipati and D. L. Kleinman, "Optimization-based decision support algorithms for a team-in-the-loop planning experiment," 2009 IEEE International Conference on Systems, Man and Cybernetics, San Antonio, TX, USA, 2009, pp. 4684-4689, doi: 10.1109/ICSMC.2009.5346103. (Year: 2009).*

*Primary Examiner* — Hafiz A Kassim
*Assistant Examiner* — Zahra Elkassabgi
(74) *Attorney, Agent, or Firm* — Procopio, Cory, Hargreaves & Savitch LLP

(57) ABSTRACT

Resource-constrained, multi-period scheduling model for asset investment planning. In an embodiment, asset-related tasks for physical equipment are received, along with a time window. Each of the asset-related tasks is associated with parameter values for each time period within the time window. A resource-constrained project scheduling model is executed to identify an optimal portfolio of the asset-related tasks that satisfies a set of constraints, according to an objective, based on the parameter values for the asset-related tasks. In the optimal portfolio, each asset-related task is assigned to a time span comprising one or more time periods in the time window. The optimal portfolio may then be used to schedule the asset-related tasks in the optimal portfolio, in order to facilitate repair, maintenance, and capital tasks, for example, by automatically dispatching work orders or resources, automatically configuring a state of the physical equipment, informing an asset management system, and/or the like.

17 Claims, 7 Drawing Sheets

(51) Int. Cl.
*G06Q 10/0631* (2023.01)
*G06Q 10/20* (2023.01)

(56) References Cited

U.S. PATENT DOCUMENTS

| | | | | |
|---|---|---|---|---|
| 2014/0343999 | A1* | 11/2014 | Kim | G06Q 10/06313 |
| | | | | 705/7.23 |
| 2015/0081367 | A1* | 3/2015 | Westlake | G06Q 10/063114 |
| | | | | 705/7.15 |
| 2017/0277568 | A1* | 9/2017 | Lu | G06F 9/50 |
| 2017/0323239 | A1* | 11/2017 | Johnson | G06Q 10/06313 |
| 2019/0146436 | A1* | 5/2019 | Perez Zarate | G16H 40/67 |
| | | | | 700/287 |

FOREIGN PATENT DOCUMENTS

| | | |
|---|---|---|
| EP | 3493128 A1 | 6/2019 |
| EP | 3816889 A1 | 5/2021 |
| WO | 2016/008601 A1 | 1/2016 |
| WO | 2017/136884 A1 | 8/2017 |
| WO | 2021/043832 A1 | 3/2021 |
| WO | 2021/107866 A1 | 6/2021 |

* cited by examiner

| Time Period (t) | 0 | 1 | 2 | 3 | 4 | 5 | 6 | 7 |
|---|---|---|---|---|---|---|---|---|
| $S_{pt}$ | 0 | 0 | 1 | 0 | 0 | 0 | 0 | 0 |
| $A_{pt}$ | 0 | 0 | 1 | 0 | 0 | 0 | 0 | 0 |

FIG. 5A

| Time Period (t) | 0 | 1 | 2 | 3 | 4 | 5 | 6 | 7 |
|---|---|---|---|---|---|---|---|---|
| $S_{pt}$ | 0 | 0 | 1 | 0 | 0 | 0 | 0 | 0 |
| $A_{pt}$ | 0 | 0 | 1 | 1 | 1 | 0 | 0 | 0 |

FIG. 5B

RESOURCE-CONSTRAINED, MULTI-PERIOD SCHEDULING MODEL FOR ASSET INVESTMENT PLANNING

BACKGROUND

Field of the Invention

The embodiments described herein are generally directed to asset investment planning (AIP), and, more particularly, to a resource-constrained multi-period scheduling model for optimizing a portfolio of asset-related tasks.

Description of the Related Art

The software industry has utilized a variety of methods intended to solve the problem of project selection in asset investment planning. Asset investment planning, in its most basic form, refers to the selection of asset-related tasks, from a list of asset-related tasks, that meet predefined objectives while satisfying known constraints. Several factors complicate such selection: the planning time window, in which asset-related tasks are to be scheduled, may include multiple time periods (e.g., months, years, etc.) and each asset-related task may have different durations, including durations that exceed the time window; asset-related tasks may have interdependencies, such that, if one is selected, the other must be selected (i.e., inclusivity), or if one is selected, the other cannot be selected (i.e., exclusivity); asset-related tasks may have time dependencies, such that one must follow another; optimization may involve multiple, sometimes conflicting objectives; constraints may be imposed at a task level (e.g., resource constraint during a particular time), sub-system level (e.g., total budget for a geographical region cannot exceed a certain amount), system level (e.g., total budget cannot exceed a certain amount), and/or the like; asset-related tasks may be of different types, such as binary (i.e., the task can only be selected or not selected), discrete (i.e., multiple equal parts, with each part capable of being selected and satisfying the task objective), or continuous (i.e., non-discrete portions of the task may be selected); and the optimal portfolio of asset-related tasks may be overwritten (e.g., a user may make some tasks mandatory and/or exclude tasks).

Stack ranking is the most widely used method for asset investment planning, due to its simplicity and ease of use. In stack ranking, asset-related tasks are ranked or "stacked," based on merit. The merit could be a simple measure of value, such as a benefit-cost ratio. Stack ranking lists each asset-related task in order from highest to lowest value, and selects asset-related tasks in order until the cumulative cost of the selected asset-related tasks reaches the total budget, irrespective of the value of the resulting portfolio of asset-related tasks. Stack ranking has many deficiencies, including that it cannot guarantee selection of the highest valued portfolio of asset-related tasks.

Another common method for asset investment planning is optimization based on the Knapsack combinatorial technique. According to this methodology, an optimal set of asset-related tasks is selected, subject to constraints (e.g., typically, total budget), with a given objective (e.g., ensuring that there is at least one of each task type). However, this method ignores the time dependency between asset-related tasks and the calendar dependency of asset-related tasks.

Other optimization methods for asset investment planning are based on mixed integer linear programming (MILP). Mixed integer linear programming is commonly used for commercial-off-the-shelf (COTS) solutions. According to this method, some of the variables are constrained to be integers (e.g., 0 or 1 representing selection or non-selection), while other variables are allowed to be non-integers (e.g., percentage of an asset-related task to be selected). Resource Constrained Project Scheduling (RCPS) is one manifestation of a general MILP formulation. Specific formulations may be classified into one of three classes: (i) select an optimal list of asset-related tasks, such that the list has the maximum value (objective) for a given total available budget (constraint) over the time window; (ii) select an optimal list of asset-related tasks, such that the list has the maximum value (objective) for a given set of one or more criteria (constraint) that is satisfied for each time period within the time window; or (iii) select an optimal list of asset-related tasks, such that the list has the maximum value (objective) within each group (e.g., region) for a given set of one or more criteria (constraint) associated with each group (e.g., cost not to exceed a certain amount in a certain region) over the time window or for each time period within the time window.

However, the above solutions to asset investment planning over-simplify the problem and do not account for real-world practicalities. The deficiencies in existing solutions may be summarized as follows:

(1) Existing solutions do not consider that every asset-related task has a definite start date and end date on a calendar.
(2) Existing solutions do not consider that certain asset-related tasks may have limited windows of opportunity (i.e., time-based calendar dependency). For example, a particular asset-related task may only be performable during a particular time or season of the year (e.g., maintenance must be done during an annual plant shutdown in the months of January through March). This time-driven constraint may prevent the selection of the asset-related task.
(3) Existing solutions combine multiple objectives into a single objective, and use the single objective for scoring each portfolio. The resulting value score is typically assumed to provide a measure of uniformity, such that different portfolios may be compared to each other. However, an inherent problem is that the value scores from two different executions of the optimization method cannot be compared if the underlying scoring methodology has changed in the intervening time.
(4) Existing solutions generally impose constraints over the entire time window, thereby ignoring constraints that may be violated in specific time periods within the time window.
(5) Existing solutions focus on binary asset-related tasks, while ignoring discrete and continuous asset-related tasks, resulting in sub-optimal portfolios, since the method cannot account for discretionary asset-related tasks.

SUMMARY

Accordingly, systems, methods, and non-transitory computer-readable media are disclosed for a resource-constrained multi-period scheduling model for optimizing a portfolio of asset-related tasks.

In an embodiment, a method comprises using at least one hardware processor to: receive a plurality of asset-related tasks for a plurality of physical equipment and a time window comprising a plurality of time periods, wherein each of the plurality of asset-related tasks is associated with parameter values for each of the plurality of time periods; receive one or more constraints; execute a resource-constrained project scheduling (RCPS) model to identify an optimal portfolio of asset-related tasks that satisfies all of the one or more constraints, according to an objective and based on the parameter values for the plurality of asset-related tasks, wherein the optimal portfolio comprises at least a subset of the plurality of asset-related tasks, and wherein each of the at least a subset of the plurality of asset-related tasks is assigned to a time span comprising one or more of the plurality of time periods within the time window; and schedule the at least a subset of the plurality of asset-related tasks based on the optimal portfolio of asset-related tasks.

The parameter values may comprise a benefit value, wherein the objective is to maximize a sum of the benefit values associated with ones of the plurality of asset-related tasks to be included in the optimal portfolio, using mixed integer linear programming. The one or more constraints may comprise, for each binary one of the plurality of asset-related tasks, a constraint that the binary asset-related task can only be started in a single one of the plurality of time periods.

The parameter values may comprise a cost value, wherein the one or more constraints comprise a constraint that a sum of the cost values associated with the at least a subset of the plurality of asset-related tasks in the optimal portfolio cannot exceed a threshold value for the time window.

The parameter values may comprise a labor value, wherein the one or more constraints comprise a constraint that a sum of the labor values associated with the at least a subset of the plurality of asset-related tasks in the optimal portfolio cannot exceed a threshold value for the time window.

The one or more constraints may comprise, for each first one of the plurality of asset-related tasks that must be performed, if at all, after a second one of the plurality of asset-related tasks, a constraint that the first asset-related task can only be included in the optimal portfolio if the second asset-related task is included in the optimal portfolio and, when included, must start in one of the plurality of time periods that is subsequent to one of the plurality of time periods in which the second asset-related task is scheduled to be completed.

The one or more constraints may comprise, for each first one of the plurality of asset-related tasks that must be performed if a second one of the plurality of asset-related tasks is performed, a constraint that the first asset-related task must be included in the optimal portfolio if the second asset-related task is included in the optimal portfolio.

The one or more constraints may comprise, for each first one of the plurality of asset-related tasks that cannot be performed if a second one of the plurality of asset-related tasks is performed, a constraint that the first asset-related task cannot be included in the optimal portfolio if the second asset-related task is included in the optimal portfolio.

The one or more constraints may comprise, for each of the plurality of asset-related tasks that must be included in the optimal portfolio, a constraint that the asset-related task must be included in the optimal portfolio.

The one or more constraints may comprise, for each of the plurality of asset-related tasks that cannot be included in the optimal portfolio, a constraint that the asset-related task cannot be included in the optimal portfolio.

The one or more constraints may comprise, for each of one or more of the plurality of asset-related tasks, a constraint that the asset-related task can only be performed within a subset of the plurality of time periods. The subset of the plurality of time periods may represent a season within a calendar year.

The plurality of asset-related tasks may be received from one or more asset performance management systems that each automatically generate a list of asset-related tasks based on field data.

Scheduling the at least a subset of the plurality of asset-related tasks may comprise transmitting the optimal portfolio to an asset management system using an application programming interface (API) of the asset management system.

The method may further comprise, by the asset management system, providing one or more asset-related tasks from the optimal portfolio to a work management system.

The method may further comprise, by the work management system, automatically, generating one or more work orders from the one or more asset-related tasks, and dispatching the generated one or more work orders to one or more recipients according to the scheduling.

The method may further comprise using the at least one hardware processor to, for at least one asset-related task in the at least a subset of the plurality of asset-related tasks, when a current time reaches a start of the time span to which the at least one asset-related task is assigned, automatically switch at least one of the plurality of physical equipment corresponding to the at least one asset-related task from a first operating state to a second operating state.

The plurality of physical equipment comprises components of a power grid.

Embodiments of the method may comprise or consist of any combination of one or more of the above features, and, conversely, may exclude any combination of one or more of the above features. In addition, any method, comprising any combination of the above features, may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 5A and 5B illustrate example values of decision variables in the alternative implementations of timing in resource-constrained project scheduling, according to embodiments;

DETAILED DESCRIPTION

In an embodiment, systems, methods, and non-transitory computer-readable media are disclosed for a resource-constrained multi-period scheduling model for optimizing a portfolio of asset-related tasks. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Infrastructure

Figure 1:
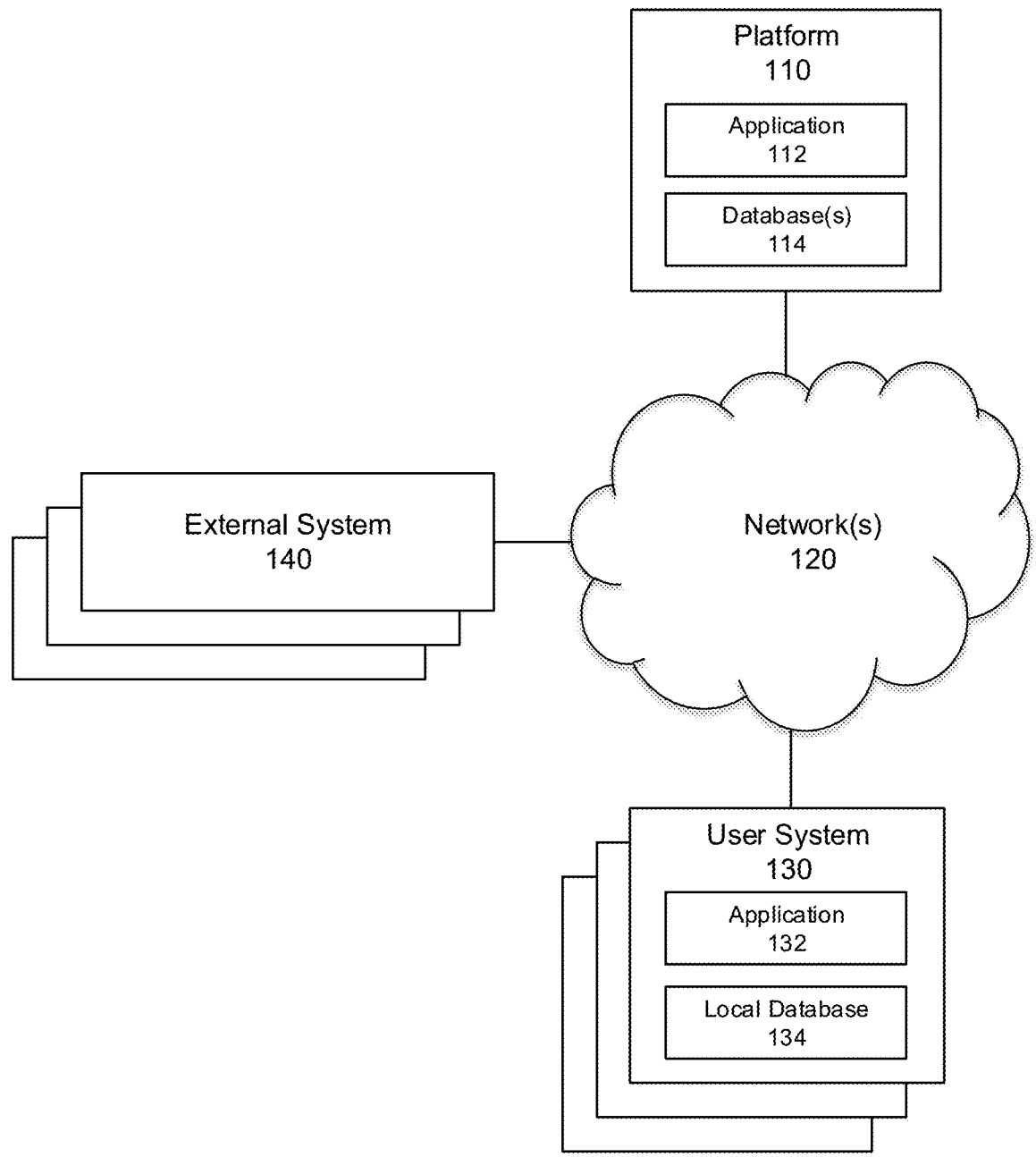
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, data sources, data consumers, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. It should be understood that platform 110 may also respond to other types of requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130 and potentially using a local database 134, may interact with a server application 112 executing on platform 110 to execute one or more or a portion of one or more of the various functions, processes, methods, and/or software modules described herein. In an embodiment, client application 132 may utilize a local database 134 for storing data locally on user system 130.

Client application 132 may be "thin," in which case processing is primarily carried out server-side by server application 112 on platform 110. A basic example of a thin client application 132 is a browser application, which simply requests, receives, and renders webpages at user system(s)

130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

1.2. Example Processing Device

Figure 2:
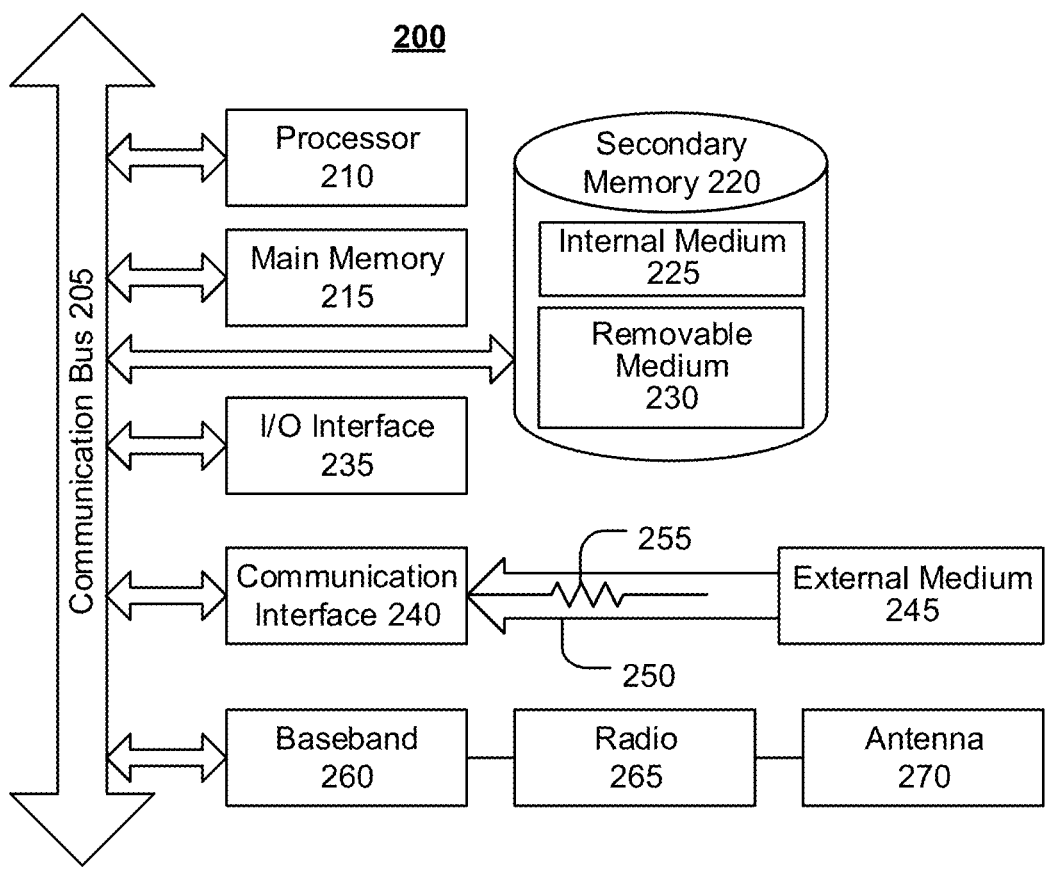
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute one or more implementing software modules) described herein, and may represent components of platform 110, user system(s) 130, external system(s) 140, and/or other processing devices described herein. System 200 can be a server or any conventional computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as software modules implementing the disclosed model) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, including one or more software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.3. Example Architecture

Figure 3:
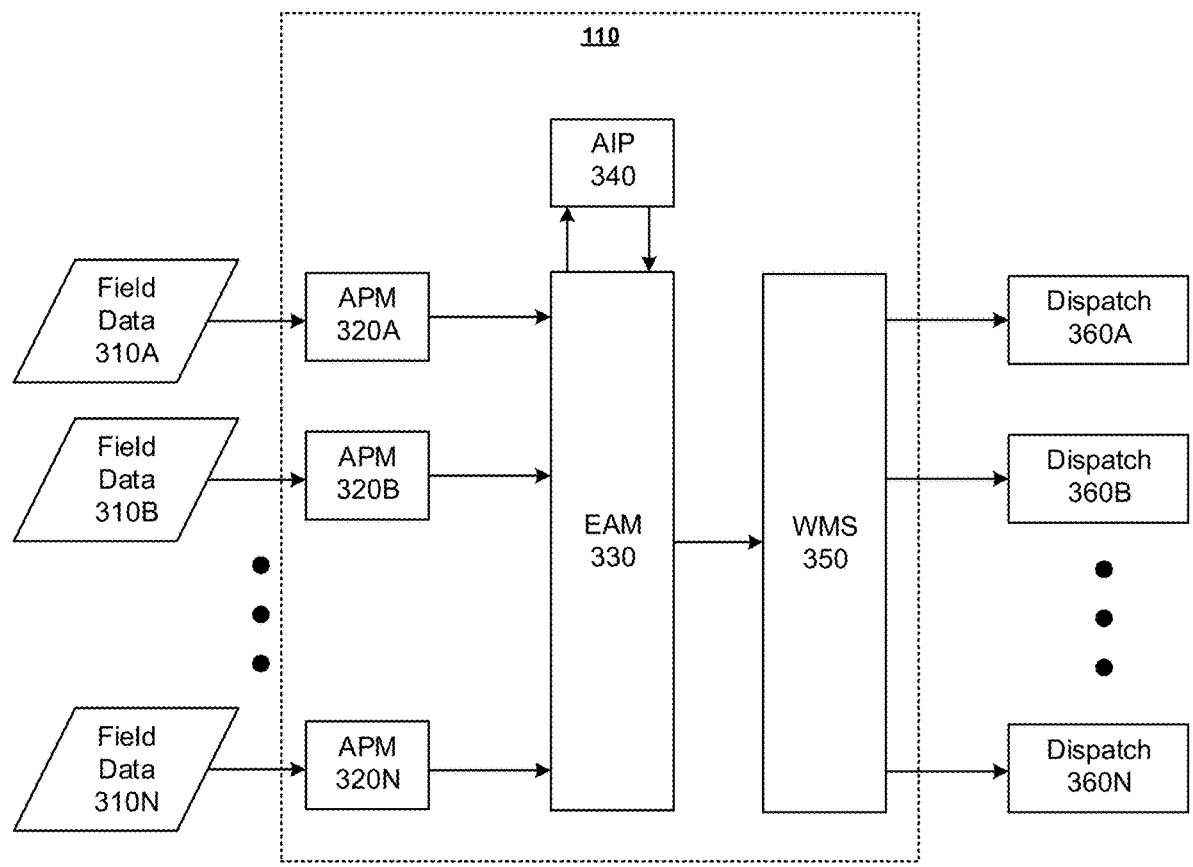
FIG. 3 illustrates an example architecture for data flow, according to an embodiment.

FIG. 3 illustrates an example architecture for data flow in platform 110, according to an embodiment. In the illustrated embodiment, the architecture comprises one or a plurality of asset performance management (APM) systems 320 (e.g., 320A, 320B, . . . , 320N), at least one enterprise asset management (EAM) system 330, at least one AIP module 340, and at least one work management system (WMS) 350. Each of APM system(s) 320, EAM system 330, AIP module 340, and WMS 350 may be implemented as software on a single processing system 200, on separate and discrete processing systems 200, in various combinations across two or more processing systems 200, and/or in the cloud. Alternatively, one or more of these systems may be implemented solely in hardware. It should be understood that APM system(s) 320, EAM system 330, AIP module 340, and WMS 350 may be comprised in a single platform 110 or distributed across a plurality of platforms 110.

Field data 310 (e.g., 310A, 310B, . . . , 310N) may be collected from one or more sensors in the field. For example, the sensors may be installed in, mounted on, or otherwise associated with physical equipment in the field, to sense one or more characteristics of the physical equipment as field data 310. Depending on the particular equipment being managed, field data 310 may comprise, without limitation, fluid content (e.g., gas, water, oil, etc.), dissolved gas composition (e.g., for up to or exceeding nine different compounds), values for standard oil tests (e.g., moisture content, surface tension, etc.), current (e.g., three phases), voltage (e.g., three phases), power (e.g., megavolt amperes, as applicable), temperature (e.g., top oil temperature, ambient temperature, etc.), speed (e.g., rotor speed), pressure (e.g., for sulfur hexafluoride (SF6) circuit breakers), one or more metrics for vibration monitoring, one or more metrics for partial discharge monitoring, one or more metrics of power factor and capacitance, and/or the like. The sensors may transmit field data 310 to a respective APM 320, in real time, near-real time, or periodically, via any standard wired and/or wireless communication protocols (e.g., over one or more networks, such as network(s) 120). In an embodiment, the sensors may communicate with a given APM system 320 via an API provided by that APM system 320.

Each APM system 320 may be associated with a particular department. Each department may manage a specific type of equipment (e.g., transmission, distribution, etc.), a specific geographical region, and/or the like. APM system 320 collects field data 310, for the equipment which it manages, from the sensors, and processes field data 310 to produce one or more recommended asset-related tasks based on field data 310. APM system 320 may identify an asset-related task to be recommended for a specific asset (e.g., maintenance or replacement of an asset) based on a holistic assessment of field data 310 related to that asset (e.g., a combination of two or more metrics that are associated with that asset within field data 310). APM system 320 may automatically (e.g., without manual intervention) or semi-automatically (e.g., after operator approval) provide one or more of the recommended asset-related tasks to EAM system 330. APM system 320 may communicate with EAM system 330 via any standard communication protocols (e.g., over one or more networks, via inter-process messaging, etc.). In an embodiment, each APM system 320 may "push" data to EAM system 330 via an API provided by EAM system 330. Alternatively or additionally, EAM system 330 may "pull" data from each APM system 320 via an API provided by that APM system 320.

EAM system 330 collects all of the recommend asset-related tasks from APMs 320 into a consolidated list of asset-related tasks. It should be understood that this list of asset-related tasks may comprise "competing" asset-related tasks from a plurality of different departments. EAM system 330 provides the list of asset-related tasks, potentially with one or more parameters and/or constraints, to AIP module 340. AIP module 340 is configured to apply the disclosed model to the list of asset-related tasks, subject to any parameter(s) and/or constraint(s), to produce an optimal portfolio of asset-related tasks. AIP module 340 returns the optimal portfolio of asset-related tasks to EAM system 330. The communication between EAM system 330 and AIP module 340 may be performed via any standard communication protocols (e.g., over one or more networks, via inter-process messaging, etc.). In an embodiment, the communication between EAM system 330 and AIP module 340 may be performed via an API provided by either EAM system 330 or AIP module 340. Alternatively, AIP module 340 may be integrated into EAM system 330.

EAM system 330 initiates work orders through WMS 350, based on the optimal portfolio output by AIP module 340. As discussed elsewhere herein, the optimal portfolio may comprise assignments of asset-related tasks to time spans comprising one or more particular time periods within a planning time window. When a current time reaches or nears (e.g., is within a threshold amount of time before) a starting time period of a particular asset-related task, EAM system 330 may send the asset-related task to WMS 350 to initiate a work order for the asset-related task. The communication between EAM system 330 and WMS 350 may be performed via any standard communication protocols (e.g., over one or more networks, via inter-process messaging, etc.). In an embodiment, EAM system 330 may "push" data to WMS 350 via an API provided by WMS 350. Alternatively or additionally, WMS 350 may "pull" data from EAM system 330 via an API provided by EAM system 330. Alternatively, WMS 350 may be integrated into EAM system 330.

WMS 350 may receive asset-related tasks from EAM system 330, generate work orders based on the received asset-related tasks, and then dispatch the generated work orders as dispatches 360. Dispatching a work order may comprise WMS 350 sending the work order to a user (e.g., an email message, a message within the user's dashboard in a graphical user interface of server application 112 or client application 132, etc.), to a user system 130 (e.g., a Short Message Service (SMS) or Multimedia Messaging Service (MMS) text message, a recorded telephone call, etc.), and/or to an external system 140 (e.g., via an API of an external system 140 maintained by a contractor or other third party). It should be understood that the work order may comprise details about the asset-related task for which it was generated, including, for example, an identification and location of the physical equipment representing the asset(s) to which the asset-related task pertains, a description of repairs or maintenance to be performed on the physical equipment, a time frame in which the work must be completed, and/or the like.

It should be understood that different types of asset-related tasks may be treated differently by platform 110. For example, EAM system 330 may initiate work orders for repair or maintenance tasks through WMS 350, but may handle capital projects, such as the purchase of new assets, differently or through a different system. In particular, capital projects cannot generally be completed via a work order alone, and therefore, may require additional handling.

2. Process Overview

Embodiments of processes for a resource-constrained multi-period scheduling model for optimizing a portfolio of asset-related tasks will now be described in detail. It should be understood that the described processes may be embodied in one or more software modules that are executed by one or more hardware processors (e.g., processor 210), for example, as the model discussed herein. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed model may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, may be illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Introduction

In an embodiment, the disclosed model comprises a resource-constrained project scheduling (RCPS) algorithm, implemented within AIP module 340. The RCPS algorithm optimizes the selection of one or more asset-related tasks as projects $p=\{0, 1, \ldots, np-1\}$ within a sequence of time periods $t=\{0, 1, \ldots, nt-1\}$, wherein np is the number of asset-related tasks to be considered and nt is the number of time periods within the time window under consideration. Each asset-related task p has options $o=\{0, 1, \ldots, no_p-1\}$, wherein $no_p$ is the number of options for a given asset-related task p. Each asset-related task p also has a duration $d_p$, expressed as a number of time periods t.

The timing at which tasks values, such as costs, benefits, and labor, are claimed in the resource-constrained project scheduling may be implemented in either a basic implementation or a segmented implementation. Cost refers to the cost of an asset-related task for a given time span or period (e.g., in terms of dollar value or other metric), benefit refers to the benefit or utility provided by the asset-related task for a given time span or period (e.g., in terms of dollar value or other metric), and labor refers to an amount of labor resources (e.g., in terms of number of personnel or crew, or other metric) required to complete an asset-related task for a given time span or period. The benefit for a given asset-related task may be calculated from key performance indicators. For repair or maintenance tasks, the benefit may be measured in terms of an improvement in the asset's reliability that would result from the asset-related task, and may be calculated using key performance indicators such as the System Average Interruption Duration Index (SAIDI), System Average Interruption Frequency Index (SAIFI), any other measure of availability, and/or the like. For capital tasks (e.g., replacement of an asset), the benefit may be measured in terms of the optimal allocation of capital, life extension, pro-active asset replacement, and/or the like.

Figure 4A:
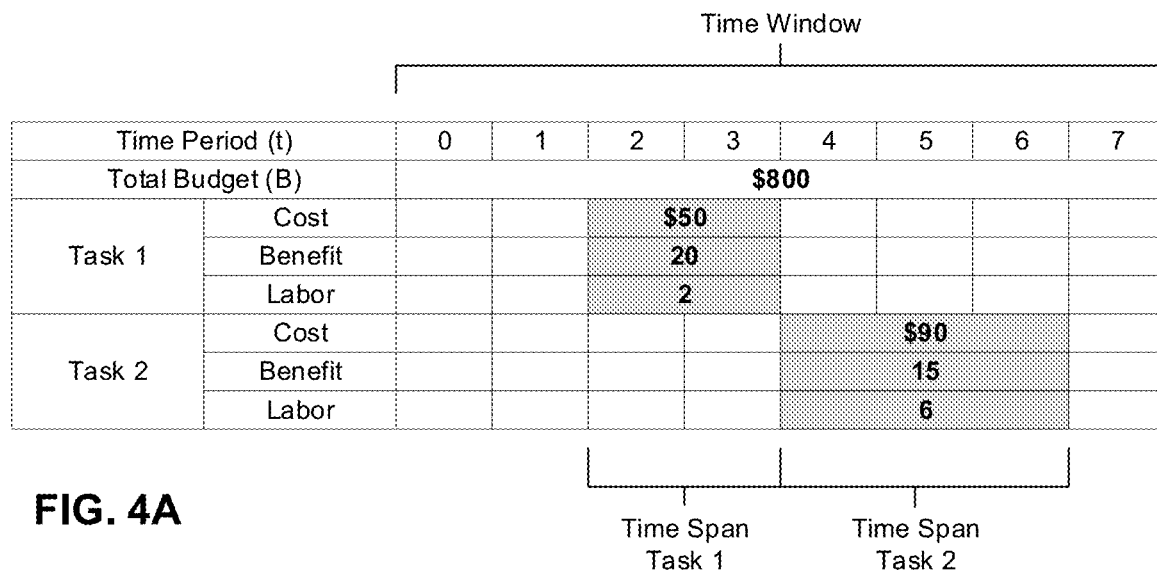
FIGS. 4A and 4B illustrate alternative implementations of timing in resource-constrained project scheduling, according to embodiments.

FIG. 4A illustrates the basic implementation of timing in resource-constrained projected scheduling, according to an embodiment. In the basic implementation, an asset-related task can span any one or more time periods within the time window. The total task values (e.g., cost, benefit, and/or labor) are claimed for the time span, as long as the time span starts within the time window, even if the time span ends outside the time window. Thus, the task values of cost=$50, benefit=20, and labor=2 are all claimed within the time span for Task 1, which spans time periods 2 and 3. Similarly, the task values of cost=$90, benefit=15, and labor=6 are all claimed within the time span for Task 2, which spans time periods 4, 5, and 6.

Figure 4B:
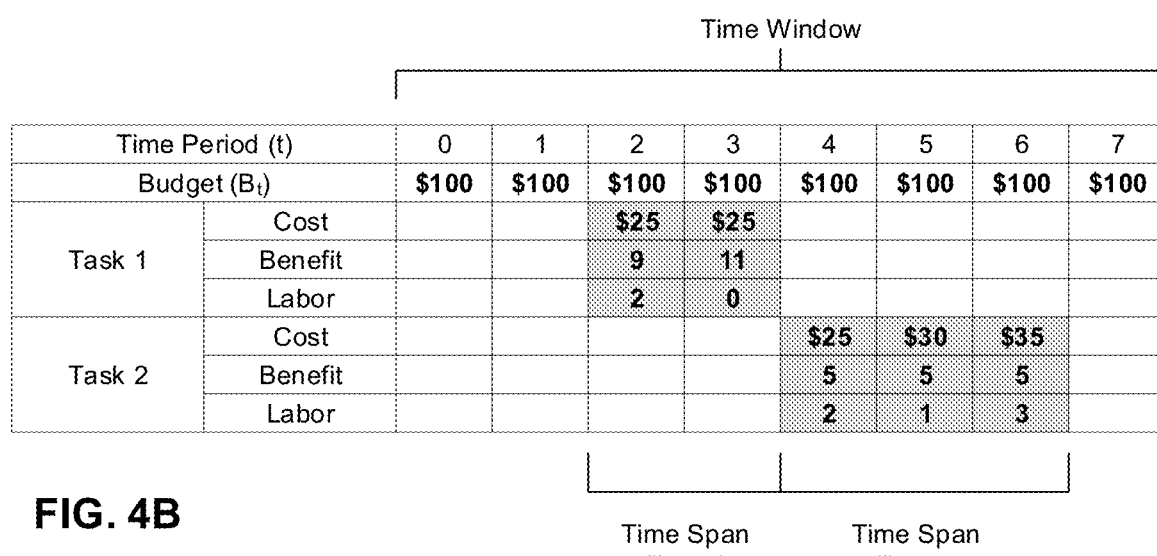

FIG. 4B illustrates the segmented implementation of timing in resource-constrained projected scheduling, according to an embodiment. In the segmented implementation, as in the basic implementation, an asset-related task can span any one or more time periods within the time window. However, if the asset-related task spans multiple time periods, the task values (e.g., cost, benefit, and/or labor) are all apportioned to respective time periods within the time span. In this case, if the time span extends outside the time window (e.g., either before the time window or after the time window), the task values are only claimed for the time periods within the time window. Thus, the task values of cost=$25, benefit=9, and labor=2 are claimed in time period 2 for Task 1, and the task values of cost=$25, benefit=11, and labor=0 are claimed in time period 3 for Task 1. Similarly, the task values of cost=$25, benefit=5, and labor=2 are claimed in time period 4 for Task 2, the task values of cost=$30, benefit=5, and labor=1 are claimed in time period 5 for Task 2, and the task values of cost=$35, benefit=5, and labor=3 are claimed in time period 6 for Task 2. Notably, in contrast to the basic implementation, in the segmented implementation, the task values are distributed across the individual time periods. As illustrated, the distribution of task values for a given asset-related task is not necessarily even, since the costs, benefits, and labor may differ between time periods.

In an embodiment, the parameters which are known prior to optimization by the disclosed RCPS algorithm may include one or more, including potentially all, of the following:

$Bud_t$: the budget for a time period t.
Bud: the total budget for the entire time window, equal to $\Sigma_{t=0}^{nt-1} Bud_t$.
$L_t$: the labor available for time period t.
L: the total labor available for the entire time window, equal to $\Sigma_{t=0}^{nt-1} L_t$.
$c_{pot}$: the cost of option o for asset-related task p in time period t.
$B_{pot}$: the benefit of option o for asset-related task p in time period t.
$L_{pot}$: the labor required by option o for asset-related task p in time period t.
$P_{pst}$: a time relationship between asset-related tasks, in which a value of 1 or "true" indicates asset-related task p can only start after asset-related task s has been completed, and a value of 0 or "false" indicates that there is no such time dependency between asset-related task p and asset-related task s.

Notably, the use of $C_{pot}$, $B_{pot}$, and $L_{pot}$, which are specific to each combination of asset-related task, option, and time period, indicates that a given asset-related task can have different costs, benefits, and labor requirements for different time periods and different options. In other words, these task values may differ depending on when the asset-related task is started and what option is selected for the asset-related task.

In an embodiment, the decision variables to be solved by the RCPS algorithm include one or both of the following:

$S_{pot}$: the start variable, which has either the value 0 to indicate that option o for asset-related task p will not start in time period t, or the value 1 to indicate that option for asset-related task p will start in time period t.

$A_{pot}$: the benefit activation variable, which has either the value 0 to indicate that the benefit from option o for asset-related task p is not activated in time period t, or the value 1 to indicate that the benefit from option o for asset-related task p is activated in time period t.

In the present disclosure, in instances in which the particular option o for an asset-related task p is not important to an understanding of an embodiment, the index of the option o may be omitted from a parameter or variable. In other words, the parameter or variable may be expressed with only two subscripts representing the index of the asset-related task p and the index of the time period t (e.g., $C_{pt}$, $B_{pt}$, $L_{pt}$, $S_{pt}$, and $A_{pt}$). In an alternative embodiment, each asset-related task p may have only a single option, such that options o may be omitted entirely, or different options for the same asset-related task may be implemented as separate asset-related tasks p within the model. In either of these cases, it should be understood that many of the expressions described herein, including the objectives and constraints of the RCPS algorithm, may be simplified, for example, by removing the need to consider (e.g., sum over) a plurality of options o for each asset-related task p.

FIG. 5A illustrates example values of the decision variables in the basic implementation, according to an embodiment. In the illustrated example, Task 1, with a span of three time periods (i.e., $d_1=3$), starts in time period 2, thus $S_{12}=1$, and all other values of $S_{1t}=0$. In the basic implementation, the benefit from Task 1 is only activated in the starting time period. In this case, the starting time period is time period 2. Therefore, during optimization, if $S_{12}=1$, then $A_{12}=1$, and all other values of $A_{1t}=0$. Accordingly, the entire benefit from Task 1 will be activated in time period 2.

FIG. 5B illustrates example values of the decision variables in the segmented implementation, according to an embodiment. In the illustrated example, Task 1, with a span of three time periods (i.e., $d_1=3$), starts in time period 2, thus $S_{12}=1$, and all other values of $S_{1t}=0$. In the segmented implementation, a portion of the total benefit from Task 1 is activated in each of the three time periods within the time span (i.e., time periods 2-4). In other words, during optimization, if $S_{12}=1$, then $A_{12}=1$, $A_{13}=1$, $A_{14}=1$, and all other values of $A_{1t}=0$. In addition, time period 2 will have a cost $C_{12}$, benefit $B_{12}$, and labor $L_{12}$, time period 3 will have a cost $C_{13}$, benefit $B_{13}$, and labor $L_{13}$, and time period 4 will have a cost $C_{14}$, benefit $B_{14}$, and labor $L_{14}$.

2.2. Inputs

In an embodiment, the inputs to the RCPS algorithm may comprise one or more, including potentially all, of the following:

a list of fully defined asset-related tasks p, along with their task values (e.g., $C_{pot}$, $B_{pot}$, $L_{pot}$, etc.);

a framework that defines how individual asset-related tasks are valued (e.g., $B_{pot}$);

the time window for planning, as well as an indication of the time periods within the time window;

a list of task interdependencies (e.g., asset-related task α can only performed, if at all, after asset-related task β, asset-related task α must be performed if asset-related task β is performed, asset-related task α cannot be performed if asset-related task β is performed, etc.);

a list of task constraints (e.g., including any calendar dependencies, such as asset-related task α cannot be performed in specific time periods); and/or any financial assumptions, such as discount rates, cost escalation, and/or the like.

These inputs may be provided to AIP module 340, implementing the RCPS algorithm, by EAM system 330. EAM system 330 may generate or otherwise derive these inputs based on data received from APM systems 320 and/or other internal data sources and/or external systems 140. Alternatively, one or more of these inputs (e.g., financial assumptions) may be persistently stored in, or in association with AIP module 340, or retrieved from one or more other internal or external systems.

2.3. Algorithm

In an embodiment, the objective of the RCPS algorithm is to maximize the total value or utility (i.e., total benefit) of the portfolio of asset-related tasks:

Objective (1A):

$$\text{Max} \sum_{t=0}^{nt-1} \left( \sum_{p=0}^{np-1} \left( \sum_{o=0}^{no_p-1} B_{pot} A_{pot} \right) \right)$$

Essentially, the objective is to maximize a sum of the benefit values associated with those asset-related tasks to be included in the portfolio using, for example, mixed integer linear programming. For a single time period (i.e., nt=1), the objective of the RCPS algorithm simplifies to:

Objective (1B):

$$\text{Max} \sum_{p}^{np-1} \left( \sum_{o}^{no_p-1} B_{po} A_{po} \right)$$

Benefit activation for an asset-related task p is strongly related to the starting time period for the asset-related task p, since the benefit cannot be activated until the asset-related task p has started. Thus, it can be assumed that:

$$\bigvee_t, \bigvee_p, \bigvee_{o_p} S_{pot} = A_{pot}$$

In the expressions described herein, the large-V operator is used to indicate that an expression is true for all of a given variable. Thus, the above expression indicates that $S_{pot} = A_{pot}$ for all options $o_p$ for all asset-related tasks p for all time periods t.

In an embodiment, during optimization by the RCPS algorithm, each asset-related task p may be constrained to only a single option o, at a time, from the available options o for that asset-related task p, as follows:

Constraint (1):

$$\bigvee p \sum_{o=0}^{no_p-1} \sum_{t=0}^{nt-1} S_{pot} \leq 1$$

In an alternative embodiment, each asset-related task p may have only a single option o, such that Constraint (1) may be omitted. In this case, different options o for the same asset-related task p may instead be expressed as separate and distinct asset-related tasks p. However, in such an embodiment, a constraint should be added to make these different options of the same asset-related task mutually exclusive (e.g., Constraint (7) below).

In an embodiment, during optimization by the RCPS algorithm, each asset-related task p may be constrained to either start in a single time period or not at all, as follows:
Constraint (2):

$$\bigvee p \bigvee o_p \sum_{t=0}^{nt-1} S_{pot} \leq 1$$

Essentially, Constraint (2) ensures that an asset-related task p can only be started in a single one of time periods t.

In an embodiment, the main resource constraint is the total budget available for the given time window. In other words, the total budget should be greater than or equal to the sum of the costs $C_{pot}$ of all activated asset-related tasks p in the given time window. This constraint may be expressed as follows:
Constraint (3):

$$\sum_{t=0}^{nt-1}\left(\sum_{p=0}^{np-1}\left(\sum_{o=0}^{no_p-1} C_{pot} S_{pot}\right)\right) \leq Bud$$

Essentially, Constraint (3) ensures that the sum of the costs $C_{pot}$, associated with the asset-related tasks p to be included in the portfolio, cannot exceed a threshold value for the time window. It should be understood that other resource constraints can be expressed in a similar manner, using any task parameter associated with the asset-related tasks p, by substituting the cost $C_{pot}$ with that task parameter.

For example, in an embodiment, another resource constraint is the total labor available for the given time window. In other words, the total labor should be greater than or equal to the sum of the labor $L_{pot}$ required by all activated asset-related tasks p in the given time window. This constraint may be expressed as follows:
Constraint (4):

$$\sum_{t=0}^{nt-1}\left(\sum_{p=0}^{np-1}\left(\sum_{o=0}^{no_p-1} L_{pot} S_{pot}\right)\right) \leq L$$

Essentially, Constraint (4) ensures that the sum of the labor $L_{pot}$, associated with the asset-related tasks p to be included in the portfolio, cannot exceed a threshold value for the time window.

The following constraint may be added for each asset-related task α that must be started, if at all, after an asset-related task β has been completed:
Constraint (5A):

$$\bigvee o_\alpha \bigvee o_s S_{\alpha ot} \leq \sum_{\tau=0}^{t-d_\beta} S_{\beta o \tau}$$

Notably, per this constraint, asset-related task α cannot be selected unless asset-related task is also selected and cannot start until after asset-related task β has finished. Essentially, Constraint (5A) ensures that asset-related task α can only be included in the portfolio, if at all, when asset-related task β is also included in the portfolio, and, when included, must start in a time period that is subsequent to the time period in which the asset-related task β is scheduled to be completed. In the event that $t-d_\beta \leq 0$, this constraint simplifies to:

$$\bigvee o_\alpha S_{\alpha ot}=0 \quad \text{Constraint (5B):}$$

In other words, according to Constraint (5B), asset-related task α cannot be selected.

The following constraint may be added for each asset-related task α that must be selected if asset-related task β is selected, but may or may not be selected if asset-related task β is not selected (i.e., asset-related task α is required by asset-related task β):
Constraint (6):

$$\sum_{t=0}^{nt-1}\left(\sum_{o=0}^{no_\alpha-1} S_{\alpha ot}\right) \geq \sum_{t=0}^{nt-1}\left(\sum_{o=0}^{no_\beta-1} S_{\beta ot}\right)$$

In other words, in conjunction with Constraint (2), if the sum of $S_{\beta ot}=1$, then the sum of $S_{\alpha ot}=1$. On the other hand, if the sum of $S_{\beta ot}=0$, then the sum of $S_{\alpha ot}=0$ or the sum of $S_{\alpha ot}=1$. Essentially, Constraint (6) ensures that asset-related task α must be included in the portfolio if asset-related task β is included in the portfolio.

The following constraint may be added for each asset-related task α that cannot be selected if asset-related task β is selected (i.e., asset-related tasks α and β are mutually exclusive):
Constraint (7):

$$\sum_{t=0}^{nt-1}\left(\sum_{o=0}^{no_\alpha-1} S_{\alpha ot}\right) + \sum_{t=0}^{nt-1}\left(\sum_{o=0}^{no_\beta-1} S_{\beta ot}\right) = 1$$

Essentially, Constraint (7) ensures that asset-related task α cannot be included in the portfolio if asset-related task β is included in the portfolio, and that asset-related task β cannot be included in the portfolio if asset-related task α is included in the portfolio.

The following constraint may be added for each asset-related task p that must be selected (i.e., mandatory):
Constraint (8):

$$\sum_{t=0}^{nt-1}\left(\sum_{o=0}^{no_p-1} S_{pot}\right) = 1$$

Essentially, Constraint (8) ensures that a specific asset-related task p must be included in the portfolio.

Conversely, the following constraint may be added for each asset-related task p that must be excluded (i.e., cannot be selected):
Constraint (9):

$$\sum_{t=0}^{nt-1}\left(\sum_{o=0}^{no_p-1} S_{pot}\right) = 0$$

Essentially, Constraint (9) ensures that a specific asset-related task p cannot be included in the portfolio.

It should be understood that the constraints, expressed above, represent examples of constraints that may be used in a particular embodiment. An embodiment may, but does not need to, comprise every constraint. Rather, a particular embodiment, may consist of none of the expressed constraints, a single one of the expressed constraints, or any combination of two or more of the expressed constraints. In addition, an embodiment may comprise other constraints that have not been explicitly expressed herein. For example, for each asset-related task that can only be performed (e.g., started and/or completed) in particular time periods, a constraint may be added that prevents that asset-related task from being performed in other time periods. It should be understood that some constraints are imposed at the problem-level (e.g., Constraints (1)-(4)), so as to be applicable to all asset-related tasks and only needing to be defined once, whereas other constraints are related to specific asset-related tasks (e.g., Constraints (8) and (9)) or combinations (e.g., pairs) of interdependent asset-related tasks (e.g., Constraints (5A)-(7)), and therefore, should be defined for each of the asset-related tasks or combinations of asset-related tasks to which they pertain.

2.4. Outputs

In an embodiment, the output of the RCPS algorithm is an optimal portfolio of one or a plurality of asset-related tasks, selected from the input list of asset-related tasks p, that satisfies the objective (e.g., Objective (1A) or (1B)) and all of the specified constraints (e.g., one or any plurality of Constraints (1) through (9)). This optimal portfolio may be returned by AIP module 340 to EAM system 330, so that EAM system 330 may initiate work orders according to the schedule of asset-related tasks in the optimal portfolio.

In addition, this optimal portfolio may be expressed within a graphical user interface, for example, within a screen of a user's account with platform 110. For example, server application 112 and/or client application 132 may generate a graphical user interface that comprises a visual representation of the optimal portfolio. This visual representation may comprise a Gantt chart or other graphic that associates the selected asset-related tasks and their time spans to specific calendar dates. The Gantt chart or other graphic may also represent task dependencies (e.g., highlight time periods in which an asset-related task must be performed, if at all) and interdependencies (e.g., highlight other asset-related tasks upon which a given asset-related task depends).

2.5. Example Optimization Process

Figure 6:
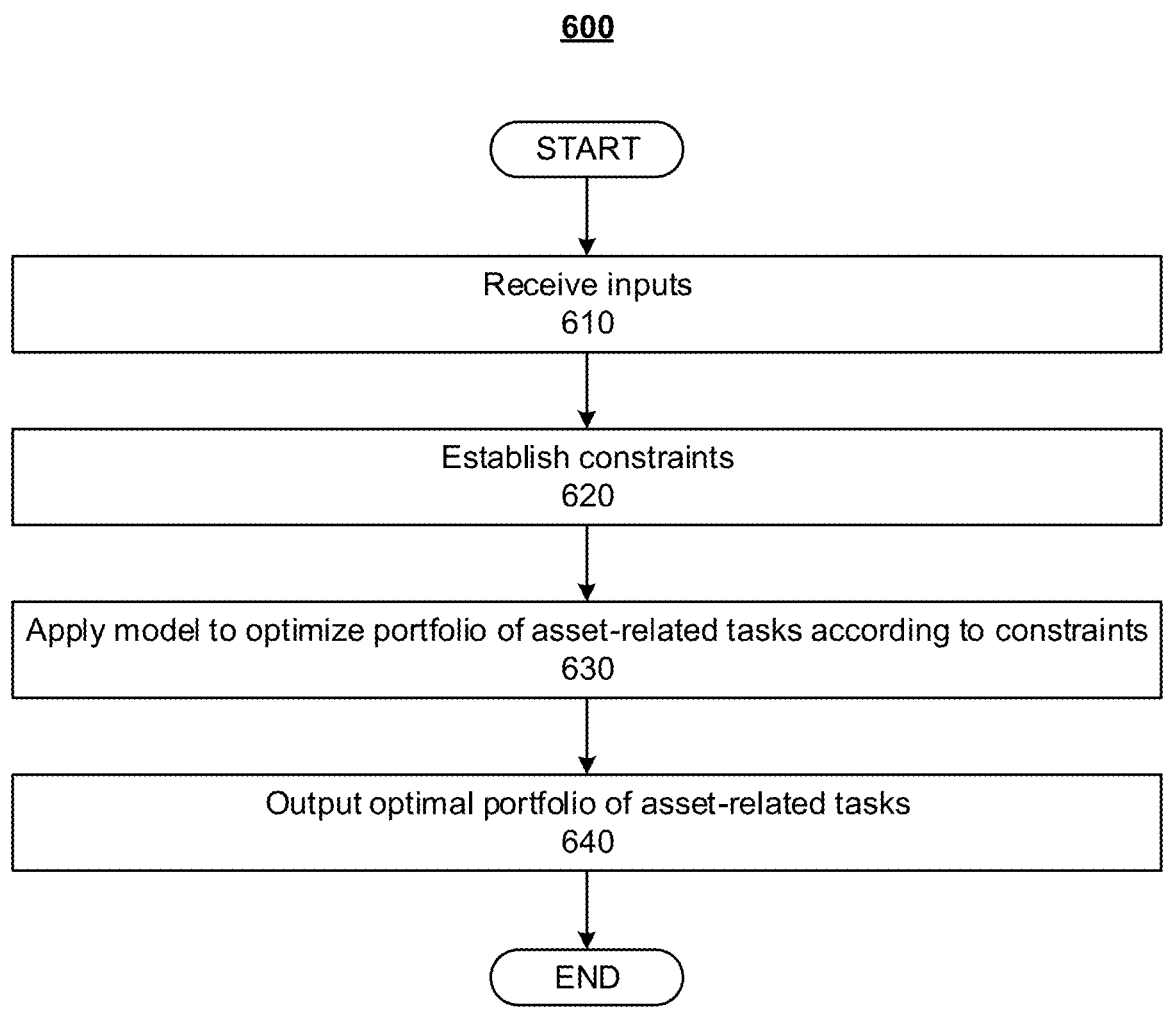
FIG. 6 illustrates an example process implementing an RCPS model, according to an embodiment.

FIG. 6 illustrates an example optimization process 600 that may be implemented by AIP module 340, according to an embodiment. It should be understood that process 600 may be performed iteratively for different sets of asset-related tasks. Iterations of process 600 may be performed periodically, or in real time or near-real time as asset-related tasks are generated by an APM system 320. For example, EAM system 330 may accumulate the asset-related tasks output by APM systems 320, and initiate an iteration of process 600 in response to any type of trigger, such as a user operation (e.g., via a graphical user interface of EAM system 330), the expiration of a time interval (e.g., daily, weekly, monthly, etc.), and/or the like.

In subprocess 610, inputs are received. The inputs may comprise any of the inputs or other parameters described herein, including, for example, the list of fully defined asset-related tasks p, the task values (e.g., cost, benefit, labor, etc.) for each asset-related task, the time window for planning, the total budget Bud for the time window, the total available labor L for the time window, task interdependencies, task calendar dependencies, any financial assumptions, and/or the like. The inputs may be received from EAM system 330, retrieved from memory associated with AIP module 340, and/or received from another source.

In subprocess 620, constraints are established. The constraints may comprise any of the constraints described herein, including one or more of Constraints (1) through (9). The constraints may be generated from inputs received in subprocess 610, received from EAM system 330, retrieved from memory associated with AIP module 340, received from another source, and/or established in any other manner.

In subprocess 630, the RCPS model is applied to the inputs, received in subprocess 610, while constrained by the constraints established in subprocess 620, to produce an optimal portfolio of asset-related tasks. In particular, the RCPS model may be executed to achieve Objective (1A), representing the optimal portfolio, based on the received inputs and with the established constraints. As described herein, this optimal portfolio may assign each of at least a subset of the asset-related tasks p, received in subprocess 610, to a time span comprising one or more time periods within the time window for planning, while satisfying all of the constraints, established in subprocess 620, and producing an optimal (e.g., maximum) value for the objective.

In subprocess 640, the resulting optimal portfolio may be output by AIP module 340 to EAM system 330 (or to other functions of EAM system 330, if AIP module 340 is integrated into EAM system 330) for the initiation of work orders (e.g., via WMS 350) and/or the like. It should be understood that completion of the work orders represents performance of the asset-related tasks in the optimal portfolio.

2.6. Example AIP Process

Figure 7:
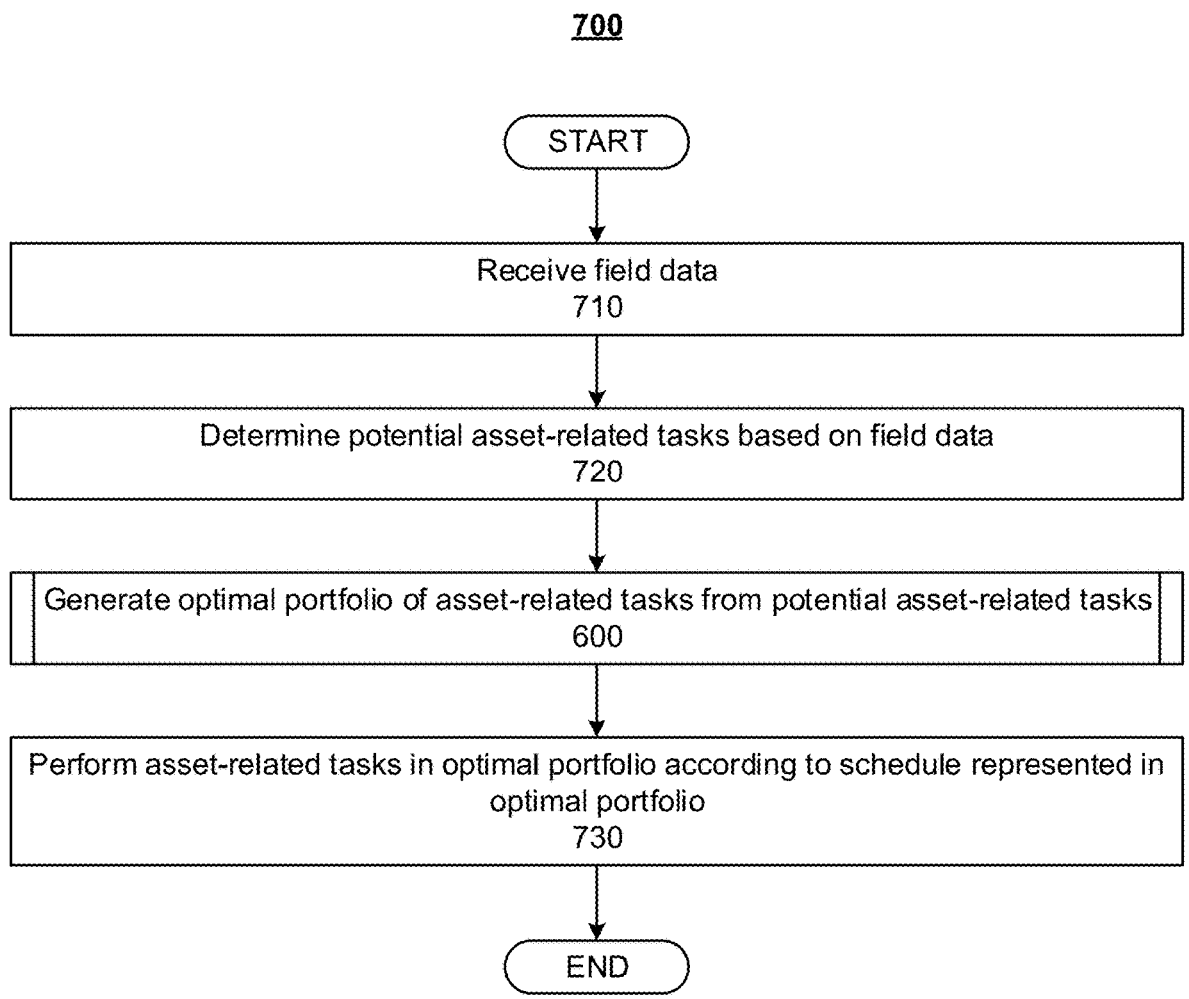
FIG. 7 illustrates an example process that utilizes an RCPS model, according to an embodiment.

FIG. 7 illustrates an example overarching AIP process 700 that utilizes optimization process 600, according to an embodiment. It should be understood that process 700 may be performed iteratively. Iterations of process 700 may be performed periodically, or in real time or near-real time as new data is received.

In subprocess 710, field data is received. For example, field data 310 may be received from sensors measuring one or more parameters of physical equipment in the field. Field data 310 may be received by one or more APM systems 320 (e.g., through an API). It should be understood that field data 310 may comprise measured parameters of physical equipment, representing the outputs of the sensors from which field data 310 were received.

In subprocess 720, potential asset-related tasks are determined based on the field data received in subprocess 710. In particular, each APM system 320 that received field data 310 may analyze that received field data 310 to determine what asset-related tasks, if any, should be performed for the physical equipment represented in that field data 310. For example, an APM system 320 may determine that a maintenance or repair task should be performed on physical equipment when a measured parameter value for that physical equipment, in the received field data 310, is outside or nearly outside a normal operating range.

In subprocess 600, as described with respect to FIG. 6, an optimal portfolio of asset-related tasks is generated from the potential asset-related tasks identified in subprocess 720. For example, each APM system 320 that has determined that one or more potential asset-related tasks should be performed may identify those potential asset-related tasks to EAM system 330 (e.g., via an API). EAM system 330 may collect the potential asset-related tasks identified by all APM systems 320, and then execute AIP module 340, implementing the disclosed RCPS model, with the collected potential asset-related tasks as an input, to generate the optimal portfolio of asset-related tasks.

In subprocess 730, the asset-related tasks in the optimal portfolio, generated in subprocess 600, are performed according to the schedule represented in the optimal portfolio. In particular, the optimal portfolio comprises an assignment of specific asset-related tasks to specific time periods within a time window. Thus, the optimal portfolio represents, not only which asset-related tasks should be performed, but also the timing at which each asset-related task should be performed.

Accordingly, when a current time reaches the time period to which a particular asset-related task is assigned in the optimal portfolio, EAM system 330 may facilitate performance of that particular asset-related task. This facilitation may comprise automatically or semi-automatically (e.g., with user approval or confirmation) initiating a work order for that particular asset-related task. In particular, EAM system 330 may communicate with WMS 350 (e.g., via an API) to dispatch work orders for each asset-related task in the optimal portfolio at or near the start of the starting time period assigned to that asset-related task.

As another example, EAM system 330 may facilitate performance of a scheduled asset-related task by automatically or semi-automatically setting the physical equipment for which the asset-related task is to be performed into a maintenance state. In this case, EAM system 330 may communicate with the physical equipment, directly or indirectly, to control the physical equipment (e.g., via the transmission of a control instruction) to switch the operating state of the physical equipment from a first operating state (e.g., normal mode) to a second operating state (e.g., maintenance mode).

As yet other examples, EAM system 330 may facilitate performance of a scheduled asset-related task by automatically alerting a user (e.g., via a graphical user interface, text message, email message, voice message, etc.) that the asset-related task needs to be performed, dispatching one or more resources for executing the asset-related task, and/or the like. In addition, EAM system 330 may utilize the optimal portfolio of asset-related tasks to optimally allocate capital resources among capital tasks within the optimal portfolio.

3. Technical Effects

Embodiments of the disclosed RCPS model can exhibit one or more advantages over conventional models. While certain exemplary advantages will now be described, it should be understood that not every embodiment must achieve every described advantage. Rather, a particular embodiment may achieve zero, one, or a plurality of the described advantages, and may achieve zero, one, or a plurality of additional advantages not specifically described herein.

In a first advantage, Objectives (1A) and (1B) do not combine multiple objectives into a single objective for scoring each asset-related task, which is a pitfall of many existing solutions. Thus, the disclosed RCPS model does not suffer from the inherent problem in existing solutions that the value of the portfolio from two different executions of the optimization method cannot be compared if the underlying scoring methodology has changed in the intervening time. In other words, the value or utility calculated from Objective (1A) or (1B) of the disclosed RCPS model can be compared over time across a plurality of executions of the disclosed RCPS model.

In a second advantage, Constraint (3) accounts for multiple time periods, such that the main resource constraint does not have to be imposed over the entire time window of the asset investment planning. Thus, unlike existing solutions, the disclosed RCPS model accounts for constraints on specific time periods within the time window.

In a third advantage, Constraints (5A) and (5B) account for the possibility that asset-related tasks may have limited windows of opportunity. In reality, certain asset-related tasks may only be performed during particular time periods within the time window of the asset investment planning. For example, it is possible that a maintenance task may only be done during an annual plant shutdown in the months of January through March. Unlike existing solutions, the disclosed RCPS model can account for these time-based calendar dependencies.

By accounting for the above deficiencies in existing solutions, the disclosed RCPS model enables automation by ensuring that these deficiencies do not have to be manually addressed, for example, through EAM 330. Rather, AIP module 340, implementing the disclosed RCPS model, is able to automatically address these deficiencies using the disclosed objective and constraints, to produce an optimal portfolio that does not require manual adjustment. Thus, EAM 330 may rely on the portfolio, output by AIP module 340, to initiate work orders (e.g., by automatically sending asset-related tasks to WMS 350 at the scheduled times). It should be understood that, while EAM 330 may initiate work orders automatically (e.g., without any manual intervention) or semi-automatically (e.g., with user confirmation), EAM 330 may still provide users with the ability to override the portfolio output by AIP module 340 (e.g., through a graphical user interface of EAM 330), if so desired.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
receive a plurality of asset-related tasks for a plurality of physical equipment and a time window comprising a plurality of time periods, wherein each of the plurality of asset-related tasks is associated with parameter values for each of the plurality of time periods;
receive one or more constraints;
execute a resource-constrained project scheduling (RCPS) model to identify an optimal portfolio of asset-related tasks that satisfies all of the one or more constraints, according to an objective and based on the parameter values for the plurality of asset-related tasks, wherein the optimal portfolio comprises at least a subset of the plurality of asset-related tasks, wherein each of the at least a subset of the plurality of asset-related tasks is assigned to a time span comprising one or more of the plurality of time periods within the time window, wherein the parameter values comprise a benefit value, wherein the objective is to maximize a sum of the benefit values associated with ones of the plurality of asset-related tasks to be included in the optimal portfolio, using mixed integer linear programming, and wherein the one or more constraints comprise, for each binary one of the plurality of asset-related tasks, a constraint that the binary asset-related task can only be started in a single one of the plurality of time periods;
schedule the at least a subset of the plurality of asset-related tasks based on the optimal portfolio of asset-related tasks; and
for at least one asset-related task in the at least a subset of the plurality of asset-related tasks, when a current time reaches a start of the time span to which the at least one asset-related task is assigned, automatically switch at least one of the plurality of physical equipment corresponding to the at least one asset-related task from a first operating state to a second operating state.

2. The method of claim 1, wherein the parameter values comprise a cost value, and wherein the one or more constraints comprise a constraint that a sum of the cost values associated with the at least a subset of the plurality of asset-related tasks in the optimal portfolio cannot exceed a threshold value for the time window.

3. The method of claim 1, wherein the parameter values comprise a labor value, and wherein the one or more constraints comprise a constraint that a sum of the labor values associated with the at least a subset of the plurality of asset-related tasks in the optimal portfolio cannot exceed a threshold value for the time window.

4. The method of claim 1, wherein the one or more constraints comprise, for each first one of the plurality of asset-related tasks that must be performed after a second one of the plurality of asset-related tasks, a constraint that the first asset-related task can only be included in the optimal portfolio when the second asset-related task is included in the optimal portfolio and, when included, must start in one of the plurality of time periods that is subsequent to one of the plurality of time periods in which the second asset-related task is scheduled to be completed.

5. The method of claim 1, wherein the one or more constraints comprise, for each first one of the plurality of asset-related tasks that must be performed when a second one of the plurality of asset-related tasks is performed, a constraint that the first asset-related task must be included in the optimal portfolio when the second asset-related task is included in the optimal portfolio.

6. The method of claim 1, wherein the one or more constraints comprise, for each first one of the plurality of asset-related tasks that cannot be performed when a second one of the plurality of asset-related tasks is performed, a constraint that the first asset-related task cannot be included in the optimal portfolio when the second asset-related task is included in the optimal portfolio.

7. The method of claim 1, wherein the one or more constraints comprise, for each of the plurality of asset-related tasks that must be included in the optimal portfolio, a constraint that the asset-related task must be included in the optimal portfolio.

8. The method of claim 1, wherein the one or more constraints comprise, for each of the plurality of asset-related tasks that cannot be included in the optimal portfolio, a constraint that the asset-related task cannot be included in the optimal portfolio.

9. The method of claim 1, wherein the one or more constraints comprise, for each of one or more of the plurality of asset-related tasks, a constraint that the asset-related task can only be performed within a subset of the plurality of time periods.

10. The method of claim 9, wherein the subset of the plurality of time periods represents a season within a calendar year.

11. The method of claim 1, wherein the plurality of asset-related tasks are received from one or more asset performance management systems that each automatically generate a list of asset-related tasks based on field data.

12. The method of claim 1, wherein scheduling the at least a subset of the plurality of asset-related tasks comprises transmitting the optimal portfolio to an asset management system using an application programming interface (API) of the asset management system.

13. The method of claim 12, further comprising, by the asset management system, providing one or more asset-related tasks from the optimal portfolio to a work management system.

14. The method of claim 13, further comprising, by the work management system, automatically, generating one or more work orders from the one or more asset-related tasks, and dispatching the generated one or more work orders to one or more recipients according to the scheduling.

15. The method of claim 1, wherein the plurality of physical equipment comprises components of a power grid.

16. A system comprising:
at least one hardware processor; and
one or more software modules that are configured to, when executed by the at least one hardware processor,
receive a plurality of asset-related tasks for a plurality of physical equipment and a time window comprising a plurality of time periods, wherein each of the plurality of asset-related tasks is associated with parameter values for each of the plurality of time periods,
receive one or more constraints,
execute a resource-constrained project scheduling (RCPS) model to identify an optimal portfolio of asset-related tasks that satisfies all of the one or more constraints, according to an objective and based on the parameter values for the plurality of asset-related tasks, wherein the optimal portfolio comprises at least a subset of the plurality of asset-related tasks, wherein each of the at least a subset of the plurality of asset-related tasks is assigned to a time span comprising one or more of the plurality of time periods within the time window, wherein the parameter values comprise a benefit value, wherein the objective is to maximize a sum of the benefit values associated with ones of the plurality of asset-related tasks to be included in the optimal portfolio, using mixed integer linear programming, and wherein the one or more constraints comprise, for each binary one of the plurality of asset-related tasks, a constraint that the binary asset-related task can only be started in a single one of the plurality of time periods, schedule the at least a subset of the plurality of asset-related tasks based on the optimal portfolio of asset-related tasks, and for at least one asset-related task in the at least a subset of the plurality of asset-related tasks, when a current time reaches a start of the time span to which the at least one asset-related task is assigned, automatically switch at least one of the plurality of physical equipment corresponding to the at least one asset-related task from a first operating state to a second operating state.

17. A non-transitory computer-readable medium having instructions stored therein, wherein the instructions, when executed by a processor, cause the processor to:

receive a plurality of asset-related tasks for a plurality of physical equipment and a time window comprising a plurality of time periods, wherein each of the plurality of asset-related tasks is associated with parameter values for each of the plurality of time periods;

receive one or more constraints;

execute a resource-constrained project scheduling (RCPS) model to identify an optimal portfolio of asset-related tasks that satisfies all of the one or more constraints, according to an objective and based on the parameter values for the plurality of asset-related tasks, wherein the optimal portfolio comprises at least a subset of the plurality of asset-related tasks, wherein each of the at least a subset of the plurality of asset-related tasks is assigned to a time span comprising one or more of the plurality of time periods within the time window, wherein the parameter values comprise a benefit value, wherein the objective is to maximize a sum of the benefit values associated with ones of the plurality of asset-related tasks to be included in the optimal portfolio, using mixed integer linear programming, and wherein the one or more constraints comprise, for each binary one of the plurality of asset-related tasks, a constraint that the binary asset-related task can only be started in a single one of the plurality of time periods;

schedule the at least a subset of the plurality of asset-related tasks based on the optimal portfolio of asset-related tasks; and for at least one asset-related task in the at least a subset of the plurality of asset-related tasks, when a current time reaches a start of the time span to which the at least one asset-related task is assigned, automatically switch at least one of the plurality of physical equipment corresponding to the at least one asset-related task from a first operating state to a second operating state.

* * * * *